United States Patent

Lin et al.

[15] 3,655,423
[45] Apr. 11, 1972

[54] PRETREATMENT OF PLASTIC SURFACES BEFORE THE APPLICATION OF AN ADHERENT ORGANIC COATING

[72] Inventors: Kingso C. Lin, Newark, Ohio; Emil J. Geering, Grand Island, N.Y.

[73] Assignee: Hooker Chemical Corporation, Niagara Falls, N.Y.

[22] Filed: Mar. 3, 1970

[21] Appl. No.: 15,916

[52] U.S. Cl.............................117/47, 117/72, 117/138.8 E, 117/138.8 F, 117/138.8 G, 117/138.8 N, 117/138.8 UA, 117/138.8 UF, 117/138.8 PV, 117/138.8 R, 117/138.8 B, 117/138.8 A, 117/138.8 D, 260/606.5 F
[51] Int. Cl. ......................................B44d 1/092, B44d 1/14
[58] Field of Search ..................117/47 A, 47 R, 72, 138.8 E; 260/606.5 F; 23/105, 107, 109

[56] References Cited

UNITED STATES PATENTS

| | | | |
|---|---|---|---|
| 3,472,678 | 10/1969 | Bruins | 117/47 A |
| 3,511,683 | 5/1970 | Espenscheid et al. | 117/47 R |
| 3,438,805 | 4/1969 | Potrake | 117/130 |

OTHER PUBLICATIONS

Chemical Abstracts, Vol. 70, 39006b (1969).

*Primary Examiner*—Murray Katz
*Assistant Examiner*—M. Sofocleous
*Attorney*—Peter F. Casella, Donald C. Studley, Richard P. Mueller and James F. Mudd

[57] ABSTRACT

The adhesion of organic coatings, e.g., paints, varnishes, dyes, and the like, to plastic substrates is improved by pretreating a plastic substrate with a reaction product of elemental phosphorus and a nucleophilic reagent or an organometallic compound. Following this pretreatment, which deposits a low oxidation state phosphorus compound at the plastic surface, the thus-treated surface is coated with an organic coating composition.

12 Claims, No Drawings

PRETREATMENT OF PLASTIC SURFACES BEFORE THE APPLICATION OF AN ADHERENT ORGANIC COATING

BACKGROUND OF THE INVENTION

There has been a rapidly increasing demand for articles such as plastics and other materials that have decorative and protective coatings. Such articles are in demand in industries as automotive, home appliance, radio and television and for use in decorative containers and the like. Heretofore, obtaining good adhesion between the organic coating compositions or organic films such as paints, lacquers, varnishes, enamels, inks and the like, and the substrate, especially plastics, has been a problem. Additionally, many substrates, e.g., polypropylene are notorious for their lack of ability to accept dyes and adhesives.

It is an object of this invention to provide a process for applying organic coating compositions, or organic films, to substrates. It is another object of this invention to provide a process for adherently applying a protective or decorative coating to substrates. A further object of the invention is to provide a process whereby substrates are rendered susceptible to bonding with organic coating compositions, or organic films. Still another object of the invention is to provide articles having a protective or decorative coating thereon. These and other objects will become apparent to those skilled in the art from the following detailed description.

SUMMARY OF THE INVENTION

This invention relates to a process for applying organic coating compositions or organic films to substrates and to the products thereof. More particularly, the invention relates to a process for applying organic coating compositions or organic films such as siccative coatings, dyes, adhesives and the like to substrates which have been subjected to a low oxidation state phosphorus compound which can be prepared by reacting elemental phosphorus with a nucleophilic reagent or organometallic compound.

DESCRIPTION OF THE PREFERRED EMBODIMENTS

Typical plastics to which the process of this invention is applicable include the homopolymers and copolymers of ethylenically unsaturated aliphatic, alicyclic and aromatic hydrocarbons such as polyethylene, polypropylene, polybutene, ethylenepropylene copolymers; copolymers of ethylene or propylene with other olefins, polybutadiene; polymers of butadiene, polyisoprene, both natural and synthetic, polystyrene and polymers of pentene, hexene, heptene, octene, 2-methylpropene, 4-methyl-hexene-1, bicylo-(2.2.1)-2-heptene, pentadiene, hexadiene, 2,3-dimethylbutadiene-1,3,4-vinylcyclohexene, cyclopentadiene, methylstyrene, and the like. Other polymers useful in the invention include polyindene, indenecoumarone resins; polymers of perhaloethylenes such as poly(tetrafluoroethylene) and poly(monochlorotrifluoroethylene); polymers of acrylate esters and polymers of methacrylate esters, acrylate and methacrylate resins such as ethyl acrylate, n-butyl methacrylate, isobutyl methacrylate, ethyl methacrylate and methyl methacrylate; alkyd resins; cellulose derivatives such as cellulose acetate, cellulose acetate butyrate, cellulose nitrate, ethyl cellulose, hydroxyethyl cellulose, methyl cellulose and sodium carboxymethyl cellulose; epoxy resins; furan resins (furfuryl alcohol or furfuralketone); hydrocarbon resins from petroleum; isobutylene resins (polyisobutylene); isocyanate resins (polyurethanes); melamine resins such as melamine-formaldehyde and melamine-urea-formaldehyde; oleo-resins; phenolic resins such as phenol-formaldehyde, phenolic-elastomer, phenolic-epoxy, phenolic-polyamide, and phenolic-vinyl acetals; polyamide polymers, such as polyamides, polyamide-epoxy and particularly long chain synthetic polymeric amides containing recurring carbonamide groups as an integral part of the main polymer chain; polyester resins such as unsaturated polyesters of dibasic acids and dihydroxy compounds, and polyester elastomer and resorcinol resins such as resorcinolformaldehyde, resorcinol-furfural, resorcinol-phenol-formaldehyde, resorcinol-polyamide and resorcinol-urea; rubbers such as natural rubber, synthetic polyisoprene, reclaimed rubber, chlorinated rubber, polybutadiene, cyclized rubber, butadiene-acrylonitrile rubber, butadiene-styrene rubber, and butyl rubber; neoprene rubber (polychloroprene); polysulfides (Thiokol); terpene resins; urea resins; vinyl resins such as polymers of vinyl acetal, vinyl acetate or vinyl alcohol-acetate copolymer, vinyl alcohol, vinyl chloride, vinyl butyral, vinyl chloride-acetate copolymer, vinyl pyrrolidone and vinylidene chloride copolymer, polyformaldehyde; polyphenylene oxide; polymers of diallyl phthalates and phthalates; polycarbonates of phosgene or thiophosgene and dihydroxy compounds such as bisphenols, thermoplastic polymers of bisphenols and epichlorohydrin (trade named Phenoxy polymers); graft copolymers of polymers of unsaturated hydrocarbons and an unsaturated monomer, such as graft copolymers of polybutadiene, styrene and acrylonitrile, commonly called ABS resins; ABS-polyvinyl chloride polymers, recently introduced under the trade name of Cycovin; and acrylic polyvinyl chloride polymers, known by the trade name of Kydex 100.

The polymers of the invention can be used in the unfilled condition, or with fillers such as glass fiber, glass powder, glass beads, asbestos, talc and other mineral fillers, wood flour and other vegetable fillers, carbon in its various forms, dyes, pigments, waxes and the like. If a wax is used as a filler, it has been found that the harder the wax, the more adherent the metal will be bound to the substrate.

The substrates of the invention can be in various physical forms, such as shaped articles, for example, moldings, sheets, rods, and the like; fibers, films and fabrics, and the like.

In the process of the invention, the substrate is subjected to at least one low oxidation state phosphorus compound usually in a solvent. The low oxidation state phosphorus compound, wherein the phosphorus has an oxidation state of less than 5, i.e., an oxidation number of −3 to +3, can be prepared by reacting elemental phosphorus, preferably elemental white phosphorus (which includes various impure or commercial grades sometimes referred to as yellow phosphorus), with a suitable nucleophilic reagent or organometallic compound (including Grignard reagents). Suitable nucleophilic reagents include basic compounds having an unshared pair of electrons on a carbon, oxygen, nitrogen, sulfur, or phosphorus atom. The preferred nucleophilic reagents have the formula $MZ_y$ wherein M is an alkali metal (Group IA) or an alkaline earth metal (Group IIA), $y$ is 1 or 2, and Z is hydroxide, alkoxide, amide sulfite, thiosulfate, mercaptide, cyanate, thiocyanate, cyanide, azide and the like.

The organometallic compounds have the general formula $R_xD$ wherein D is a metal selected from Groups IA, II, and IIIA of the Periodic Table, $x$ is 1 to 3, and R is alkyl of one to 18 carbon atoms, aryl of six to 18 carbon atoms, alicyclic of five to 18 carbon atoms, aralkyl of seven to 18 carbon atoms and alkylaryl of seven to 18 carbon atoms. The R groups can be unsubstituted or substituted with halogen, nitro groups and the like. Typical organometallic compounds include di(n-butyl) cadmium, diphenylcadmium, dimethylcadmium, diisopropylcadmium, di(p-nitrophenyl) cadmium, triphenylmethylsodium, dianilinocadmium, diethylzinc, di(o-tolyl) zinc, methylzinc chloride, phenyllithium, butyllithium, cyclohexyllithium, triethylaluminum and the like.

The organometallic compounds include Grignard reagents which are the well-known alkylmagnesium halides such as methylmagnesium iodide, ethylmagnesium bromide, n-propylmagnesium chloride, isopropylmagnesium chloride, phenylmagnesium bromide and the like.

Useful hydroxides include sodium hydroxide, potassium hydroxide, lithium hydroxide, cesium hydroxide, magnesium hydroxide, strontium hydroxide, calcium hydroxide, barium hydroxide and the like.

The metal alkoxides are alcohols or phenols in which the hydrogen atoms of the hydroxyl group has been replaced by the metal. Thus, the term alkoxide encompasses alkylates and phenates. In these compounds, Z is OR, which represents the alcohol or phenol without the hydroxylic or phenolic hydrogen and where R is as hereinbefore defined. The alcohol or phenol from which the alkoxide is derived can be unsubstituted or substituted with hydrocarbon groups, halogen, nitro groups and the like. Typical alkoxides are lithium methoxide, lithium ethoxide, sodium methoxide, sodium ethoxide, sodium propoxide, potassium methoxide, potassium ethoxide, cesium ethoxide, barium methoxide, calcium ethoxide, sodium pentadecanoxide, sodium phenate, potassium phenate, calcium phenate, sodium chloro-phenate, potassium chlorophenate, barium chlorophenate, sodium phenylethoxide, potassium phenylethoxide, magnesium phenylethoxide, sodium p-nitrophenoxide, calcium p-nitrophenoxide, sodium β-naphthoxide, potassium β-naphthoxide, barium β-naphthoxide, and the like.

The metal amides are compounds where Z is R'R''N- wherein R' and R'' are individually selected from the group consisting of hydrogen, R and

The R groups can be unsubstituted or can be substituted with halogen, nitro groups, hydrocarbon groups and the like. Useful metal amides include sodium amide, potassium amide, lithium amide, cesium amide, magnesium amide, calcium amide, barium amide, sodium anilide, potassium nitroanilide, calcium chloroanilide, sodium ethyl amide, potassium diethyl amide, sodium propyl amide, sodium cyclopentyl amide, N-sodium acetamide and the like.

Useful sulfites and thiosulfates include sodium sulfite, potassium sulfite, lithium sulfite, calcium sulfite, barium sulfite, magnesium sulfite, sodium thiosulfate, potassium thiosulfate, calcium thiosulfate, barium thiosulfate, mangesium thiosulfate and the like.

The mercaptides are metallic derivatives of mercaptans in which the sulfur hydrogen is replaced by a metal. Typical examples include sodium methylmercaptide, potassium ethylmercaptide, cesium propylmercaptide, calcium butylmercaptide, barium octylmercaptide, sodium phenylmercaptide, potassium nitrophenylmercaptide, calcium chlorophenylmercaptide, sodium tolylmercaptide, potassium p-ethylphenylmercaptide and the like.

Useful cyanate, thiocyanate, cyanide and azide compounds include sodium cyanate, potassium cyanate, barium cyanate, calcium cyanate, sodium thiocyanate, potassium thiocyanate, lithium thiocyanate, magnesium thiocyanide, barium thiocyanate, sodium cyanide, potassium cyanide, strontium cyanide, sodium azide, potassium azide, barium azide and the like.

The phosphorus is reacted with the nucleophilic reagent or organometallic compound in a gram atom to gram mole ratio that can vary from 100/1 to 1/100 phosphorus to reagent or compound, preferably, from 10/1 to 1/10. The reaction is generally conducted below the decomposition point of the nucleophilic reagent or organometallic compound and below the boiling point of the solvent, if a solvent is used, preferably from about minus 20 to about 200 degrees centigrade and more preferably at about 0 to about 60 degrees centigrade. The reaction time varies depending on the nature of the nucleophilic reagent or organometallic compound, the solvent and the temperature but is generally in the range of about 1 minute to 24 hours.

The resulting low oxidation state phosphorus compounds are employed in a solvent. The phosphorus can be reacted with a nucleophilic reagent or organometallic compound in the solvent or in a similar manner, the phosphorus can be reacted with a mixture or nucleophilic reagents in a common solvent or reacted with each reagent in a solvent and the products combined. Suitable organic solvents or diluents for the low oxidation state phosphorus compounds are solvents or mixtures thereof that dissolve the phosphorus compounds and do not interact with the compounds to rapidly destroy their activity. Solvents that reduce or only slowly destroy the activity of the phosphorus compounds of this invention can be used if they have compensating properties, such as the property of swelling the surface of the substrate.

Suitable solvents are generally neutral or only weakly acidic. They can be polar or non-polar. Strongly solvating solvents, either protic or di-polar aprotic are preferred. Solvents that swell a plastic surface or penetrate below the surface without detrimentally affecting the surface are preferable. Typical solvents or diluents can be aliphatic or aromatic and usually contain up to 30 carbon atoms. They include aliphatic and aromatic hydrocarbons, ethers, and thioethers; carbonyl compounds such as esters and ketones; nitrogen-containing compounds such as amides, amines, nitriles and nitro compounds; alcohols; phenols; mercaptans; and halogen-containing compounds. Examples of solvents include alcohols such as methanol, ethanol, propanol, butanol, octyl alcohol, decyl alcohol, benzyl alcohol, cyclohexanol, ethylene glycol, glycerol, and the like; aromatic hydrocarbons of six to 18 carbon atoms such as benzene, toluene, xylene, ethyl benzene, naphthalene, tetralin, and the like; ethers such as methyl ether, ethyl ether, propyl ether, isopropyl ether, methyl t-butyl ether, 3-methoxyhexane, anixol, carbitol, diphenyl oxide, and the like; alkanes of one to 18 carbon atoms such as methane, ethane, propane, hexane, octane, decane, octadecane, cyclopentane, cyclooctatetraene, and the like; dipropyl sulfide; dibutyl sulfide; dimethyl sulfoxide; tetrahydrothiophene; butyl formate; methyl acetate; ethyl acetate, benzyl acetate; phenyl carbonate; formamide; dimethylformamide; acetamide; N-methyl-2-pyrrolidone; acetone; nitrobenzene; monochlorobenzene; acetophenone; isophorone; tetrahydrofuran; halogenated hydrocarbons and halocarbons such as chloroform, carbontetrachloride, trichloroethylene, trichloroethane, dichloropropane, ethyl dibromide, ethylchlorobromide, and the like; aniline; hexylamine; acetonitrile; benzonitrile; hexamethylphosphoramide; dodecylmercaptan; phenols such as phenol, resorcinol, catechol, hydroquinone, para-tertiary-butyl phenol, para-chlorophenol, para-phenyl phenol, cresol, thiophenol, mercaptophenol and the like; and the like solvents or diluents. The amount of low oxidation state phosphorus compounds in solution, as measured by the amount of phosphorus therein, can vary from about 0.0001 weight percent phosphorus based on the total weight of the solution to about a saturated solution, preferably from 0.01 to 0.1 percent phosphorus.

As a result of the treatment with the low oxidation state phosphorus compound, the compound is deposited at the surface of the substrate. By this is meant that the low oxidation state phosphorus compound can be located on the surface, embedded in the surface and embedded beneath the surface of the substrate. The location of the low oxidation state phosphorus compound is somewhat dependent on the action of the solvent on the substrate.

Prior to contacting the substrate with the low oxidation state phosphorus compounds, the surface of the substrate should be clean. However, it is not necessary to subject the surface to special treatment such as etching, polishing and the like. The subjection of the substrate to the solution of low oxidation state phosphorus compounds is generally conducted at a temperature below the softening point of the substrate, and below the boiling point of the solvent. Generally, the temperature is in the range of about minus 30 to 135 degrees centigrade, but preferably in the range of about 15 to 100 degrees centigrade. The contact time varies depending on the nature of the substrate, the solvent and the temperature, but is is generally in the range of about 1 second to 1 hour or more preferably in the range of 1 to 10 minutes.

Following the first treatment step, the substrate can be rinsed with a solvent, and then dried by merely exposing the substrate to the atmosphere or to inert atmosphere such as nitrogen, carbon dioxide, and the like, or by drying the surface with radiant heaters or in a conventional oven. Drying times can vary considerably, for example, from 1 second to 30 minutes or more, preferably 5 seconds to 10 minutes, more preferably 5 to 120 seconds. The rinsing and drying steps are optional. The treated substrate is thereafter stored before further treatment or can be immediately subjected to the subsequent processing steps.

Organic coatings or organic films can be adherently bonded to the hydrophilic substrates resulting from the third treatment step. The organic coatings or organic films include siccative coatings, dyes, adhesives and the like. the siccative coating compositions used in the practice of this invention are often referred to as paint (oil and latex based), lacquers, varnishes, enamels and similar protective and decorative coatings. They are characterized by being comprised of a volatile or solvent portion and a nonvolatile or film forming portion. The volatile or solvent portion of the composition may be a conventional solvent such as toluene, xylene, mineral spirits, kerosene, alcohols, esters such as ethyl acetate or naphtha, or more desirably for elevated temperature applications, substantially non-flammable halogenated aliphatic hydrocarbon solvents. Examples of halogenated solvents include trichloroethylene, perchloroethylene, the trichloroethanes, tetrachloroethane, ethylene chloride, ethylene dichloride, ethylidene chloride, the dichlorotetrafluoroethanes, the trichlorotetrafluoroethanes, the trichlorodifluoroethanes, the tetrachlorodifluoroethanes, the fluorotrichloroethanes, the fluorotetrachloroethanes, methyltrifluoroethylene, 1,2-dichloropropane, 1,2-dichloropropene, 1,1,2-trichloropropane, ethyltrichloroethylene and mixtures thereof as well as other halogenated compounds similar in property to those recited above. As can be noted, these materials are often of about one to four carbon atoms and about one to six halogen atoms.

The nonvolatile or film forming portion of the siccative coating composition may be organic and/or inorganic. Normally, coating compositions such as paints, lacquers and varnishes contain both organic and inorganic materials. The primary requirement of the coating composition is that it be compatible with the solvent used.

The particular film forming materials used can be either the thermoplastic or thermosetting type. These include film forming vehicles hardened by mere evaporation of solvent, as well as those requiring a subsequent curing step to completely harden the vehicle. Most preferred vehicles are those which quickly assume a fixed adherent film after withdrawing from the coating composition. Such vehicles include varnishes, lacquers, enamels, alkyds, epoxy oils, epoxy resins, phenolic resins, phenolic modified resins, drying oils and the like, in addition to various modifications thereof.

The siccative coating compositions are generally maintained between about 20 and about 146 degrees centigrade and can contain pigments and/or coloring agents, fillers and the like insoluble materials. Typical pigments and/or coloring agents conventionally employed in coating compositions are chrome yellow, chrome green, zinc yellow, molybdate orange, hansa yellow, the iron blues, the iron yellows, the iron reds, titanium dioxide, zinc oxide, toluidiene red, peacock blue and the like. The coating compositions can be applied by roller coater, brush, spraying, dipping or other conventional means of application known in the art.

Ink is another type of siccative coating composition which can be used in the practice of this invention. The inks are normally a mixture of a finely divided pigment such as carbon black suspended in a drying oil such as linseed oil. Frequently, the compositions contain alkyds, phenol-formaldehyde or other synthetic resins and cobalt, manganese and lead salts to promote rapid drying by oxidation and polymerization. Mineral oils are sometimes used. Inks which dry by evaporation of a volatile solvent, such as those disclosed hereinbefore, rather than by oxidation and polymerization of a drying oil or resin can be employed in this invention. Additionally, colored inks, i.e. incorporating pigments or coloring agents such as those described hereinbefore, can also be employed.

The substrates treated by the process of this invention can be bonded to one another and to other materials by means of adhesives. Typical adhesives include thermosetting resins such as urea, melamine, phenol, resorcinol, furan, epoxy, polyurethane, and unsaturated polyester resins; thermoplastic resins such as cellulose esters and ethers, acrylic esters, polyamides, polystyrene, synthetic elastomers, poly(vinyl alcohol); starch and dextrins; animal glues (e.g., bone blue, hide glue), blood; casein; asphalt; shellac; natural rubber; sodium silicate; and the like adhesives. The adhesive compositions can be applied to the treated substrates and caused to harden in the conventional matter, e.g., by polymerization, oxidation, vulcanization, gellation, hydration, evaporation of volatile constituents and reduction of pressure or cooling below the softening range.

The dyes that are employed in this invention are usually a colored organic compound or mixture which can be applied and give color to the treated substrate in a reasonably permanent fashion. Most dyes of commercial importance are synthesized from aromatic hydrocarbon (coal-tar dyes) and related material. They are classified according to chemical composition and also according to the way in which they behave during application. Thus, a dye can belong to one of the following chemical classes: nitroso, nitro, monazo, disazo, trisazo, polyazo, azoic, stilbene, diphenolmethane, triarylmethane, xanthene, acridine, quinoline, methine, thiiazole, indamine, indophenol, azine, oxazine, thiazine, sulfur, lactune, aminoketone, hydroxyketone, anthraquinone, indigoid, phthalocyanine, and natural (i.e. obtained from animal or vegetable matter with little or no chemical processing such as curcuma, carmine, litmus, indigo, chlorophyll and walnut oil). The dyes can be classified according to the way they behave during application as follows: vat, direct, acid and sulfur dyes, fluorescent brightners, mordant, solvent, dispersed, basic, food, drug and cosmetic dyes. The most important chemical types are the azo, anthraquinone, sulfur, indigoid and stilbene dyes. Some typical dyes which can be used in this invention include chrysamine G; para red, chichage, bluesics B; methyl orange; congo red; azobenzene; azoxypenzene; alizarin; indanthrene; indanthrene golden yellow GK; and the like.

The following examples serve to illustrate the invention but are not intended to limit it. Unless specified otherwise, throughout this specification and claims, all temperatures are in degrees centigrade and parts are understood to be expressed in parts by weight.

PREPARATION OF LOW OXIDATION STATE PHOSPHORUS COMPOUNDS

EXAMPLE 1

A low oxidation phosphorus compound solution was prepared by reacting 1 gram mole of lithium ethoxide in 600 milliliters of ethanol with 1 gram atom of elemental yellow phosphorus.

EXAMPLE 2

An ethanol solution of sodium ethoxide was prepared by adding 11.5 grams of sodium to 300 milliliters of ethanol. An ethanol solution of a low oxidation state phosphorus compound was prepared by stirring at room temperature for several hours a mixture of 0.5 gram atom of white phosphorus with the sodium ethoxide solution.

EXAMPLES 3–8

Solutions of low oxidation state phosphorus compounds were prepared by dissolving the following nucleophilic reagents or organometallic compounds in the following solvents and then adding white phosphorus to the solution in a ratio of one gram atom of phosphorus to one gram mole of the reagent or compound:

| Example | Reagent or Compound | Solvent |
| --- | --- | --- |
| 3 | sodium propoxide | propyl alcohol |
| 4 | sodium butoxide | butanol |
| 5 | butylmagnesium bromide | ethyl ether |
| 6 | sodium amide | ethanol |
| 7 | sodium-sec-butyl | ethanol |

| 8 | mercaptide triethyl aluminum | tetrahydrofuran |

COATING OF SUBSTRATES

EXAMPLE 9

Molded disks of a graft copolymer of polybutadiene, acrylonitrile and styrene(ABS) were immersed in 20 milliliters of the low oxidation state phosphorus compound solution of Example 1 for 1 to 3 minutes and allowed to dry in the air. Thereafter, water was sprayed on the treated surface and could be observed to spread. In contrast, the ABS samples prior to treatment with the low oxidation state phosphorus compound do not have wettable surfaces.

EXAMPLE 10

An ABS molded disk was dipped in the low oxidation state phosphorus compound solution of Example 1 for about 1 to 3 minutes and allowed to dry in the air. The treated plastic was written upon with a ballpoint pen and the writing was difficult to rub off.

EXAMPLE 11

An ABS molded disk was immersed in 20 milliliters of the solution of Example 1 for 1 to 3 minutes and allowed to dry in the air. Thereafter, provincial gold Super Kem Tone manufactured by Sherwin Williams (a water base paint) was applied to the treated surface. The adhesion of the paint to the test sample was better than the adhesion of the paint to a sample of untreated ABS.

EXAMPLE 12

Examples 9, 10, and 11 are repeated employing samples of ABS but substituting each of the low oxidation state phosphorus compound solutions of Examples 2–8 inclusive. These experiments demonstrate that each of the treated samples become hydrophilic, accept ink and accept water base paints.

EXAMPLE 13

Polypropylene plaques are subjected to the low oxidation state phosphorus compound solution of Example 2 for 5 minutes and allowed to dry. Thereafter, individual plaques are painted with Toco semi-gloss coral pink (organic base paint), Krylon Pastel Yellow Spray Enamel No. 1802, ACB primer (an oleo resinous phenolic), Indo Shellac, and Preparakote (an alkyd resin type primer). In each instance, the adhesion of the siccative coating on the treated sample is better than the adhesion of the siccative coating on control samples of the plastic which had not been treated by the process of this invention.

EXAMPLE 14

Commercial polyurethane and epoxy cements are applied to the surfaces of two samples of ABS and the adhesives are allowed to set overnight. One of the samples of the plastic is not treated and the other is immersed in the solution of Example 1 for 3 minutes. On the untreated sample, the epoxy cement does not have any adhesion to the plastic and the polyurethane shrinks to about one-third of the original area of the surface which it covered and can be lifted from the plastic with practically no evidence of adhesion. On the treated sample, the epoxy and polyurethane adhesives exhibit substantial adhesion to the plastic.

EXAMPLE 15

A sample of ABS is subjected to the low oxidation state phosphorus compound solution of Example 2 for 5 minutes and allowed to dry. The treated plastic and a sample of untreated plastic are immersed in Textile Institute TIS Stain No. 2, an aqueous acid (acetic) dye at room temperature for 5 minutes and thereafter washed for 2 minutes in water. The untreated sample is uneffected and the treated sample obtains a pale pink color. Treated and untreated plastic are immersed in boiling dye solution for 5 minutes and washed with water for 2 minutes. The untreated sample becomes a pale purple but the color can be wiped off. The treated sample is a darker purple than the control and the color can not be wiped off.

EXAMPLE 16–22

Example 11 is repeated except that the ABS samples were replaced by the following plastics. In each instance, the adhesion of the paint to the treated substrates is greater than the adhesion to untreated samples.

| Example | Substrate |
| --- | --- |
| 16 | polyethylene |
| 17 | polyurethane |
| 18 | polycarbonate |
| 19 | phenolic resin |
| 20 | polyvinyl chloride |
| 21 | polystyrene |
| 22 | polymethyl methacrylate |

Various changes and modifications can be made in the process and products of this invention without departing from the spirit and the scope of the invention. The various embodiments described herein serve to further illustrate the invention but are not intended to limit it.

We claim:

1. A process for improving the adherence of an organic coating to a plastic substrate which comprises treating a plastic surface with at least one reaction product of elemental phosphorus and a nucleophilic reagent or an organo metallic compound in a solvent, depositing said reaction product at said plastic surface and, thereafter, applying an organic coating composition to the thus-treated plastic surface.

2. The process of claim 1 wherein the nucleophilic reagent is of the formula $MZ_y$ wherein M is an alkali metal or alkaline earth metal, $y$ is one or two, and Z is hydroxide, alkoxide, amide, sulfite, thiosulfate, mercaptide, cyanate, thiocyanate, cyanide or azide.

3. The process of claim 2 wherein Z is alkoxide.

4. The process of claim 3 wherein the organic coating composition is a siccative coating composition.

5. The process of claim 3 wherein the organic coating composition is a polyurethane adhesive.

6. The process of claim 3 wherein the organic coating composition is an epoxy adhesive.

7. The process of claim 3 wherein the organic coating composition is a dye.

8. A plastic article having adherently bound to the surface thereof a reaction product of elemental phosphorus and a nucleophilic reagent or organometallic compound, and having an organic coating composition adherently bound to said reaction product.

9. The article of claim 8 wherein the nucleophilic reagent is an alkali metal alkoxide or an alkaline earth metal alkoxide.

10. The article of claim 9 wherein the organic coating composition is a siccative coating composition.

11. The article of claim 9 wherein the organic coating composition is a polyurethane adhesive.

12. The article of claim 9 wherein the organic coating composition is an epoxy adhesive.

* * * * *